(12) United States Patent
Sweeting et al.

(10) Patent No.: US 8,380,614 B1
(45) Date of Patent: Feb. 19, 2013

(54) DYNAMIC PRICE IMPROVEMENT

(75) Inventors: Michael Sweeting, Aldershot (GB); Jim Johnson, London (GB)

(73) Assignee: BGC Partners, Inc., New York, NY (US)

( * ) Notice: Subject to any disclaimer, the term of this patent is extended or adjusted under 35 U.S.C. 154(b) by 0 days.

(21) Appl. No.: 13/228,940

(22) Filed: Sep. 9, 2011

Related U.S. Application Data

(63) Continuation of application No. 10/826,779, filed on Apr. 16, 2004, now Pat. No. 8,019,672.

(60) Provisional application No. 60/463,835, filed on Apr. 16, 2003.

(51) Int. Cl.
*G06Q 40/00* (2006.01)

(52) U.S. Cl. .......................... 705/37; 705/38

(58) Field of Classification Search .............. 705/35–40
See application file for complete search history.

(56) References Cited

U.S. PATENT DOCUMENTS

| | | | |
|---|---|---|---|
| 5,136,501 A | 8/1992 | Silverman et al. | |
| 5,878,416 A | 3/1999 | Harris et al. | |
| 5,905,974 A | 5/1999 | Fraser et al. | |
| 6,021,397 A | 2/2000 | Jones et al. | |
| 6,098,051 A | 8/2000 | Lupien et al. | |
| 6,850,907 B2 | 2/2005 | Lutnick et al. | |
| 7,162,448 B2 | 1/2007 | Madoff et al. | |
| 7,209,896 B1 * | 4/2007 | Serkin et al. | 705/37 |
| 7,212,999 B2 | 5/2007 | Friesen et al. | |
| 7,225,151 B1 * | 5/2007 | Konia | 705/37 |
| 7,383,220 B1 | 6/2008 | Keith | |
| 7,392,214 B1 | 6/2008 | Fraser et al. | |
| 7,533,052 B2 | 5/2009 | Tilfors et al. | |
| 7,558,753 B2 | 7/2009 | Neubert et al. | |
| 7,574,395 B2 | 8/2009 | Sweeting | |
| 7,660,761 B2 | 2/2010 | Zhou et al. | |
| 2001/0042785 A1 | 11/2001 | Walker et al. | |
| 2001/0044767 A1 | 11/2001 | Madoff et al. | |
| 2001/0044770 A1 | 11/2001 | Keith | |
| 2002/0169703 A1 | 11/2002 | Lutnick et al. | |
| 2003/0033212 A1 | 2/2003 | Sandhu et al. | |
| 2003/0046218 A1 | 3/2003 | Albanese et al. | |
| 2004/0117302 A1 | 6/2004 | Weichert et al. | |

(Continued)

FOREIGN PATENT DOCUMENTS

| | | |
|---|---|---|
| GB | 2389687 | 12/2003 |
| WO | WO 97/08640 | 3/1997 |

(Continued)

OTHER PUBLICATIONS

U.S. Appl. No. 60/463,835, filed Apr. 16, 2003, Sweeting et al.

(Continued)

*Primary Examiner* — Thu Thao Havan
(74) *Attorney, Agent, or Firm* — David E. Boundy

(57) ABSTRACT

A system and method is provided to enable traders to price improve on an item at an amount less than a predetermined pricing increment. Traders can improve on the price of the item using different price improvement levels (e.g., four different levels). Dynamic price improvement enables a dynamic order to maintain a predetermined position in a trading stack relative to other orders in the stack. The dynamic order may maintain its position in the trading stack by adjusting (e.g., increasing or decreasing) its price improvement level depending on market conditions. For example, a dynamic order may increases its price improvement level such that it stays at least one level ahead of the next best order in the trading stack. If the level cannot be further increased, the dynamic order may use its timestamp to maintain its position in the stack.

30 Claims, 8 Drawing Sheets

U.S. PATENT DOCUMENTS

| | | | |
|---|---|---|---|
| 2004/0210511 | A1 | 10/2004 | Waelbroeck et al. |
| 2004/0243505 | A1 | 12/2004 | Sweeting et al. |
| 2004/0254804 | A1* | 12/2004 | Peterffy et al. .................. 705/1 |
| 2006/0229967 | A1 | 10/2006 | Sweeting |
| 2010/0250425 | A1 | 9/2010 | Sweeting |

FOREIGN PATENT DOCUMENTS

| | | |
|---|---|---|
| WO | WO 00/38093 | 6/2000 |
| WO | WO 00/57307 | 9/2000 |
| WO | WO 00/67172 | 11/2000 |

OTHER PUBLICATIONS

U.S. Appl. No. 09/216,464, filed Dec. 18, 1998, Lutnick et al.

Phillip H. Wiggins, Dow Jumps 25.83 Points to 2,519.77, N.Y. Times, Jul. 29, 1987 at D1.

Steve Watkins, Is the Specialist System Doomed? With Dick Grasso Gone, More Trouble is Brewing for NYSE Specialists, Traders Magazine, Nov. 1, 2003, at 1.

John A. Byrne, Price Improvement Belongs to Dealers, Professor Says, Traders Magazine, Jan. 1, 2003, at 38.

Ananth Madhavan, Market Microstructure: A Practitioner's Guide, 58 Financial Analysts Journal 5, Sep.-Oct. 2002, at 28-42, 4, 6.

Allen Ferrell, Much Ado About Order Flow; 25 Regulation 1, Spring 2002, at 58.

UK Patent Office Communication and Examination Report for Application No. GB 0408554.4, Jul. 31, 2006 (3 pages).

USPTO Office Action for U.S. Appl. No. 10/171,009, Sep. 20, 2007 (13 pages).

USPTO Examiner Interview Summary Record and Notice of Allowance and Fees Due for U.S. Appl. No. 10/171,009, Oct. 14, 2008 (10 pages).

USPTO Office Action for U.S. Appl. No. 12/412,119, Jan. 6, 2011 (16 pages).

USPTO Office Action for U.S. Appl. No. 10/826,779, Mar. 4, 2008 (13 pages).

USPTO Office Action for U.S. Appl. No. 10/826,779, Dec. 9, 2008 (17 pages).

USPTO Office Action for U.S. Appl. No. 10/826,779, Mar. 24, 2009 (3 pages).

USPTO Office Action for U.S. Appl. No. 10/826,779, Sep. 1, 2009 (21 pages).

USPTO Office Action for U.S. Appl. No. 10/826,779, May 25, 2010 (25 pages).

USPTO Pre-Brief Appeal Conference Decision for U.S. Appl. No. 10/826,779, Dec. 16, 2010 (2 pages).

USPTO Notice of Allowance and Fees Due for U.S. Appl. No. 10/826,779, Jan. 21, 2011 (17 pages).

USPTO Notice of Allowance and Fees Due for U.S. Appl. No. 10/826,779, May 11, 2011 (5 pages).

Canadian Examination Report for Application No. 2,464,583, dated Jan. 16, 2012 (3 pages).

* cited by examiner

DYNAMIC PRICE IMPROVEMENT

BACKGROUND

This application claims the benefit of U.S. application Ser. No. 10/826,779, now issued as U.S. Pat. No. 8,019,672, and U.S. Provisional Application No. 60/463,835, filed Apr. 16, 2003, both incorporated herein by reference.

The present invention relates to systems and methods for providing electronic trading systems, and more particularly to trading systems that allow traders to improve prices for a particular item.

Electronic trading systems provide a platform for which traders can trade items such as financial instruments (e.g., stocks, bonds, securities, futures, contracts, currency, etc.) or household goods (e.g., old records, antiques, sports cards, etc.). In many of these trading systems, bid/offer-hit/lift processes are used to negotiate a sale of a given item. In connection with such processes, traders may submit bids (i.e., prices they are willing to purchase an item) and/or offers (i.e., prices they are willing to sell an item). A trader may respond to bids or offers by submitting sell (or hit) or buy (or lift or take) commands to the trading system. A trade is executed when a trader issues a hit or lift (or take) command in response to a bid or offer, respectively.

The prices at which bids and offers can be submitted usually conform to some sort of fixed interval or increment, where the interval is set by the trading system or dictated by the type of item being traded. For example, if a trader is trading United States Treasuries in a brokerage trading system, that trader can submit bid or offer prices that vary by ¼ of ¹⁄₃₂nd of a point in Treasuries up to a maturity of under 10 years, and ½ of ¹⁄₃₂nd of a point for maturities over 10 years and over. If traders desire to submit bids or offers that are more competitively priced than other prices, they are limited to submitting bids or offers at the predetermined pricing intervals.

Therefore, it is an object of the invention to provide systems and methods for enabling traders to improve on the price of a particular item, within the predetermined pricing increments.

SUMMARY

An electronic trading system allows traders to submit orders with dynamic price improvement, the improvement being at an amount less than a predetermined pricing increment.

In general, price improvement enables one or more traders to improve on a price for an item being traded in a market, without having to improve on the price using the predetermined pricing increment. Traders can improve on the price of an item using different price improvement levels. This allows traders to select among different aggressive price improvement increments to price improve, for example, on a bid, offer, buy, or sell price. For example, the trading system may provide several price improvement levels (e.g., four levels) for which the trader can improve the price.

A price improvement level may improve on a particular price at a fraction of the predetermined pricing increment of the item being traded, with the particular price improvement level being a multiple of the fraction. The fraction of the standard increment may depend on the particular price improvement level chosen (e.g., a price improvement level of one, two, three, etc.). For example, the two-year United States government bond may trade at standard increments of ¼ of ¹⁄₃₂ of a nominal value. Thus, trading two-year U.S. government bonds with price improvement enables a trader to submit an order that slightly improves on a price at a fraction of the (¼ of ¹⁄₃₂ for a 2 year maturity) predetermined pricing increment. Assuming for example that the price improvement increment is equivalent to one eighth of the predetermined pricing increment, a price improvement level of one may improve the price by one eighth of the predetermined pricing increment, and a price improvement level of three may improve the price by three eighths of the standard increment.

An order having a dynamic price improvement level enables the order to change its price improvement level (e.g., the level may change from one to three to two) depending on market conditions. The dynamic price improvement level does not have a fixed price improvement level—it is dynamic. The price improvement level of the dynamic order can vary from a price improvement level of zero to the maximum price improvement level available. Thus, depending on market conditions, a dynamic price improvement level order may, for example, have a price improvement level of one at a first instance and a price improvement level of four at a second instance.

The dynamic nature of the price improvement level enables a dynamic order to maintain a predetermined position in a trading stack. A trading stack typically includes orders that have not been matched with a contra order. Generally, orders at the top of the stack are matched before orders at the bottom of the stack. Using price improvement, traders are able to submit price improved orders in an attempt to "jump" to the top of the stack so that their order will be matched before other orders in the stack.

Dynamic orders can modify their price improvement levels such that they maintain a predetermined position relative to other orders in the stack. For example, if a dynamic order is initially placed at the top of the stack, the dynamic order can change (e.g., increase) its price improvement level to maintain its position at the top of the stack when new orders are submitted with price improvement levels that exceed or match that of the dynamic order.

Dynamic orders may have a timestamp indicating the time at which the order is submitted to the trading system. The timestamp may be used to determine the dynamic order's position in the stack when its price improvement level is the same as another order and its price improvement level cannot be increased beyond the maximum price improvement level.

In general, in a first aspect, the invention features a method for improving the price of an item. An electronic trading system provides a trading stack; receives a dynamic price improvement order to trade the item at an improved price; assigns one of a plurality of price improvement levels to the order, the assigned price improvement level defining the improved price of the order such that the order is placed in a predetermined position within the trading stack; and maintains the position of the order in the stack until the order is matched or cancelled.

In general, in a second aspect, the invention features an electronic trading system for improving the price of an item. The system provides a trading stack; receives a dynamic price improvement order to trade the item at an improved price; assigns one of a plurality of price improvement levels to the order, the assigned price improvement level defines the improved price of the order such that the order is placed in a predetermined position within the trading stack; and maintain the position of the order in the stack until the order is matched or cancelled.

In general, in a third aspect, the invention features an apparatus for implementing an electronic trading system. A plurality of workstations, each have a workstation storage device; a workstation processor connected to the workstation storage device, the workstation storage device storing a workstation program for controlling the workstation processor; and the workstation processor operative with the workstation program to receive a dynamic price improvement order to trade on an item at an improved price, and to display the order. A server is operative to communicate with the plurality of workstations and receive the dynamic price improved order, the server comprising: a server storage device; a server processor connected to the server storage device, the server storage device storing a server program for controlling the server processor; and the server processor operative with the server program to: provide a trading stack; assign one of a plurality of price improvement levels to the order, the assigned price improvement level defines the improved price of the order such that the order is placed in a predetermined position within the trading stack; and maintain the position of the order in the stack until the order is matched or cancelled.

Embodiments of the invention may include one or more of the following features. The maintaining may include adjusting the price improvement level of the order to maintain the predetermined position. Adjusting may include increasing the price improvement level. The adjusting may include decreasing the price improvement level. The predetermined position may be the front of the trading stack. The server may assign a timestamp to the order, and to maintain the position based on the timestamp. In the event two or more the dynamic price improvement orders are received, the orders with older timestamps may be matched prior to orders with newer timestamps. Each one of the price improvement levels may represent a fraction of a predetermined pricing increment for which the price of the item is improved upon. The maintaining may include adjusting the price improvement level to one level higher than the next best order in the stack, up to a maximum price improvement level. The predetermined position may be the position of the order relative to other orders in the stack. The assigning may include: determining the price improvement level of a best order in the stack; and assigning a price improvement level to the dynamic price improvement order that exceeds the price improvement level of the best order by one price improvement level when the price improvement level of the best order is not a maximum price improvement level. The maximum price improvement level may be assigned to the dynamic price improvement order when the price improvement level of the best order is at the maximum price improvement level. The dynamic price improvement order may be the default price improvement order type for a predetermined number of traders. The dynamic price improvement order may be one of several price improvement order types available to be selected by a trader using the electronic trading system. The price improvement level of at least one price improved order submitted subsequent to a dynamic order may be decreased such that the price improvement level of the at least one price improved order does not exceed the price improvement level of the dynamic order. The price improvement level of the at least one price improved order may be decreased to a price improvement level one level below a maximum price improvement level when the at least one price improved order is submitted having the maximum price improvement level as its price improvement level.

The above advantages and features are of representative embodiments only, and are presented only to assist in understanding the invention. It should be understood that they are not to be considered limitations on the invention as defined by the claims. Additional features and advantages of embodiments of the invention will become apparent in the following description, from the drawings, and from the claims.

DESCRIPTION OF THE DRAWINGS

The above and other objects and advantages of the invention will be apparent upon consideration of the following detailed description, taken in conjunction with accompanying drawings, in which like reference refers to like parts throughout, and in which:

FIG. 1 is an illustration of a dialog window that may be generated;

FIG. 5 shows an illustration of a market cell that may be generated;

DESCRIPTION

As defined herein, price improvement refers to the ability to submit orders that improve on a price for a particular item at an amount less than a predetermined pricing increment. A predetermined pricing increment is typically defined by the instrument being traded. For example, the two-year United States government bond may trade at predetermined pricing increments of ¼ of 1/32 of a nominal value. Thus, in conventional trading systems, a user has to submit a traditional order, which varies in price only by the predetermined pricing increment.

In a trading system that uses price improvement, traders can submit price improved orders that improve on the price at fractions of the pre-determined pricing increment. For example, a trading system may include three levels of price improvement in which a trader can improve the price. If a trader submits an order with a price improvement level of one (e.g., the first level of price improvement), that order improves on a predefined price (e.g., price at which an item is being traded or a price submitted in response to a request for quote) by a predefined fraction of the predetermined pricing increment. A price improved order with a price improvement level of two (e.g., the second level of price improvement) improves on the predefined price by twice the predefined fraction of the predetermined pricing increment. Note that the number of price improvement levels is not limited to a particular number of levels, and that a predetermined number of levels can be used.

The foregoing discussion is not meant to be thorough discussion of price improved orders, but merely an illustrative discussion that sets forth the framework in which dynamic price improved orders operate. A detailed description of price improved orders can be found, for example, in U.S. patent application Ser. No. 10/171,009, filed Jun. 11, 2001.

Traders can submit orders using a dynamic BEST price improvement level (hereinafter "dynamic price improvement level"). A dynamic price improvement level is a price improvement level that ensures that the dynamic price improved order maintains a predetermined position within the stack. That is, if the dynamic order is placed on top of the stack, it remains at the top of the stack until it is matched or cancelled.

Each dynamic price improvement order has a price improvement level and a timestamp. The price improvement level is a non-traditional price improvement on a traditional price increment such as the level one, two, or three price improvement level, as discussed above. The timestamp indicates the time at which the dynamic order is submitted, and may be used to establish priority over other orders that have the same price improvement level, including other dynamic orders.

Figure 1:
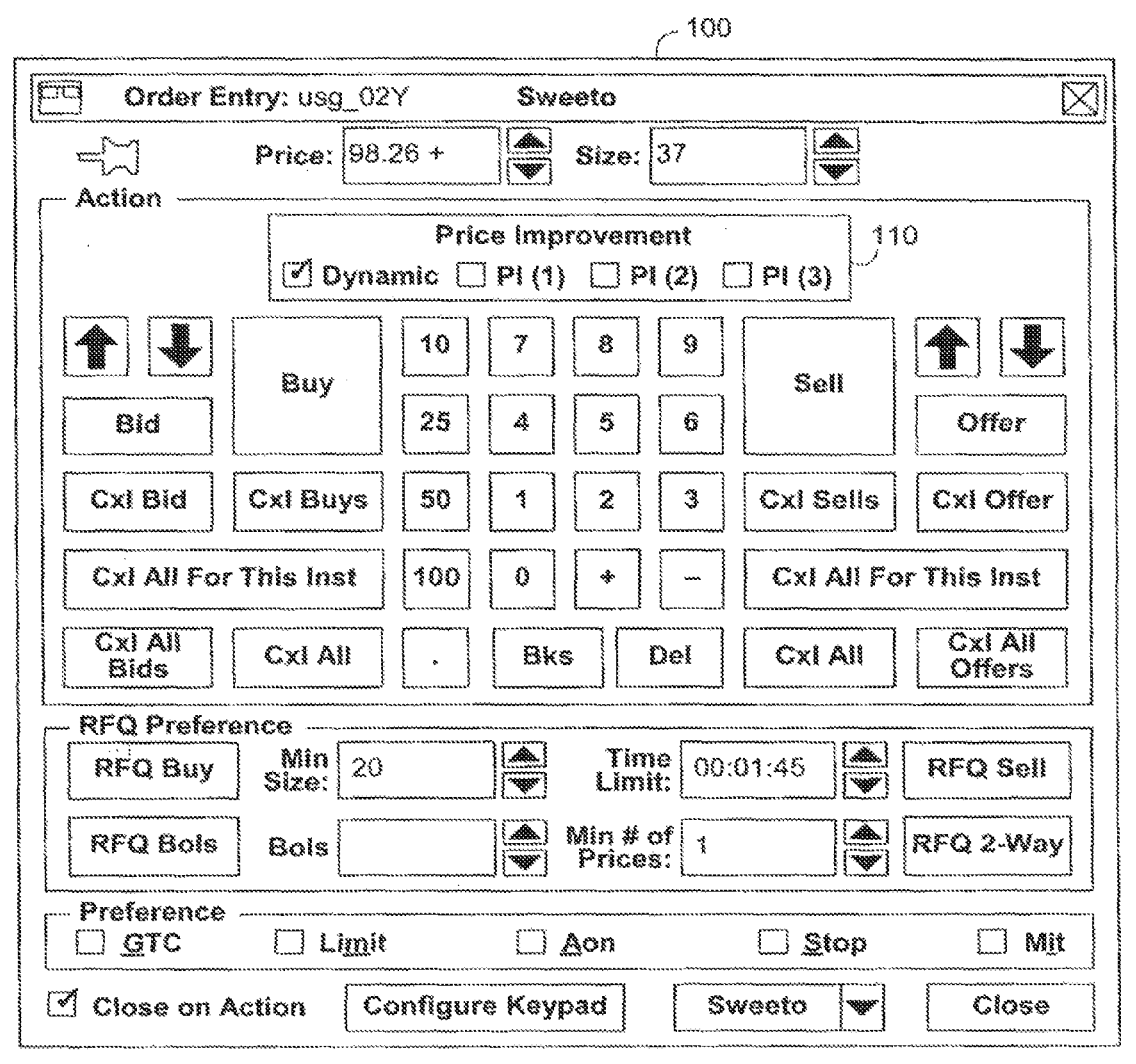
Figure 7:
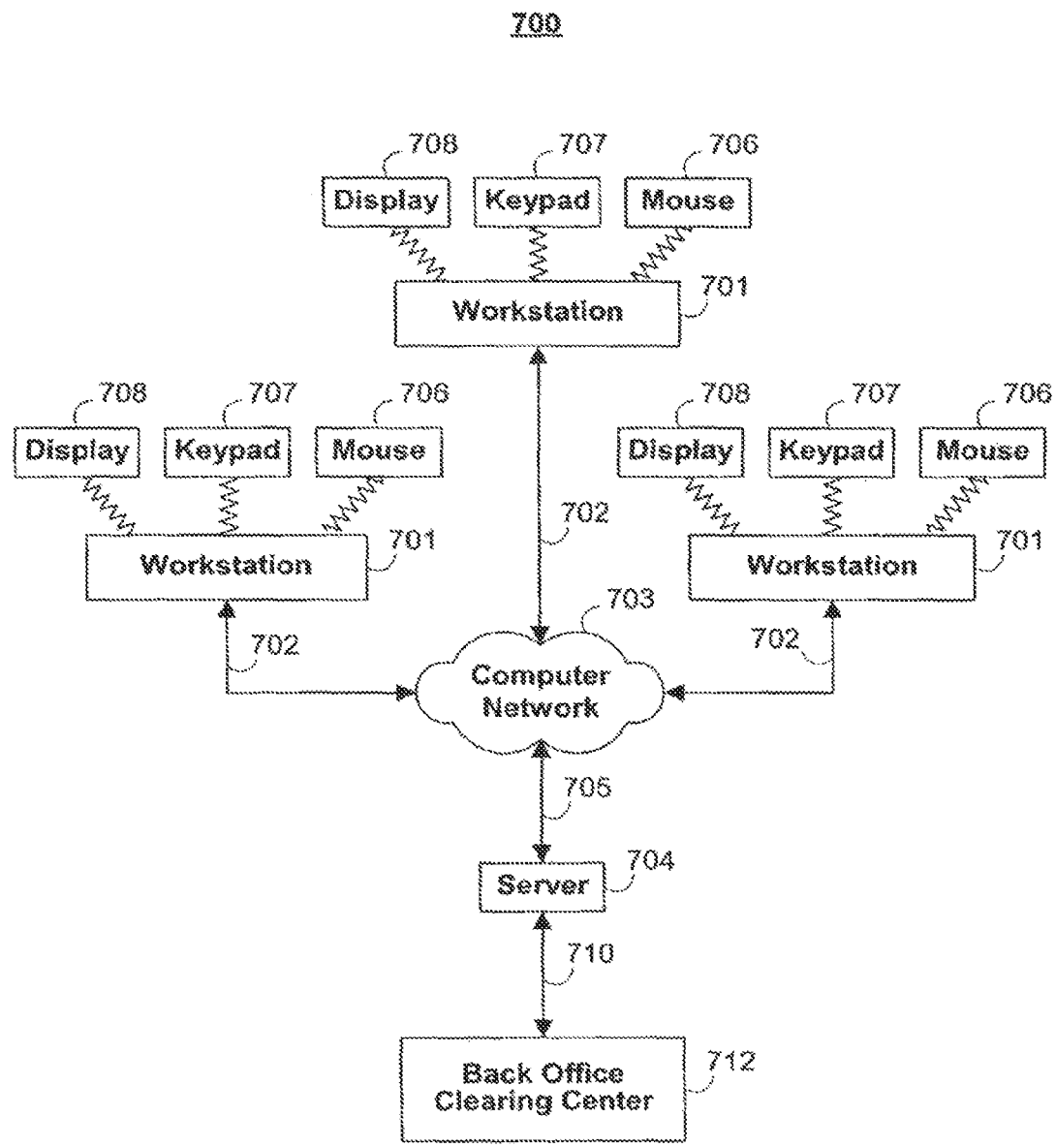
FIG. 7 is a block diagram of a system.

FIG. 1 illustrates one embodiment of a graphical interface 100 for submitting trading commands using, for example, a workstation as shown in FIG. 7. Interface 100 includes price improvement trading box 110, which has first, second, and third price improvement level options and a dynamic best price improvement option that can be selected by the trader. If a trader wishes to trade with dynamic price improvement, the dynamic price option in box 110 can be selected.

In trading systems where the dynamic price improvement is default, the dynamic price option in box 110 may be selected automatically. Alternatively, price improvement box 110 may not be displayed when the dynamic price improvement level is default.

Persons skilled in the art will appreciate that the above description with respect to FIG. 1 is not intended to be an exhaustive description of various features that can be included with dialog window 100. U.S. patent application publication No. 2002-0029180 published Mar. 7, 2002, which is hereby incorporated by reference in its entirety, provides a substantial description of dialog window 100.

Price improvement trading can be implemented with a variety of trading schemes such as, for example, Direct Dealing (hereinafter "DD") (sometimes referred to as "Request for Quote" style trading) and traditional market style trading. In DD style trading, there are requesters and responders. The requesters can enter a request for prices on a particular item or instrument. A responder may submit prices in response to that request. The requester may then choose to trade with one of the responders. The responders may use dynamic price improvement to improve on the prices submitted in response to the request, thereby enhancing the position of the improving trader relative to the other responding traders (i.e., the requesting trader may be more likely to accept the dynamically improved quote over the other responder's non price-improved quotes).

Traditional market style of trading enables traders to submit bids and offers for a particular item. Traders can hit a bid or lift an offer to commence trade. Traditional market style of trading may also enable traders to submit buy and sell orders. Traders may use dynamic price improvement to improve on bids and offers, and buy and sell orders that are being traded in a market.

An advantage of dynamic price improvement is that the price improvement level of the order is dynamic. That is, the price improvement level for a particular order may increase or decrease depending on market conditions. This creates a trading scheme in which the dynamic order changes to maintain its position relative to the other orders in the stack, thereby maintaining its position in the stack. For example, if a trader submits a dynamic order and that order is placed at the top of the stack, this order maintains its position at the top of the stack, while the price of the item being traded is maintained at its predetermined price increment price, by adjusting its price improvement level (e.g., increase its price improvement level such that it exceeds the price improvement level of the next best order by one level) until it is matched with a contra order or cancelled.

The dynamic order may increase its price improvement level up to a maximum price improvement level, at which point it uses its original timestamp to maintain its position at the top of the stack where the timestamp is older than subsequent orders.

The presence of dynamic orders in the stack may cause the system to decrease the price improvement level of certain price improved orders submitted subsequent to dynamic orders such that the price improvement level of the dynamic orders are not inflated when such inflation is not needed to maintain their respective positions in the stack. Thus, this avoids using unnecessary price improvement levels on orders that cannot improve their position in the stack by virtue of the pre-existing dynamic price improvement order. For example, assume that a dynamic order is in a stack with a price level of two. Then a trader submits a price improved order with a price improvement level of three, which in this case is assumed to be the maximum price improvement level. Instead of increasing the price level of the dynamic order to three, the system may decrease the price level of the price improved order to two. This way, the dynamic order still maintains its position in the stack, but does not have its price improvement level increased to three.

The trading system may or may not provide traders with the option of selecting which price improvement level they wish to trade. For example, in one embodiment, users may be permitted to select a specific price improvement level such as a price improvement level of one or the dynamic best price improvement level. This results in orders being arranged in a stack according to their respective price improvement levels and timestamps by default without user intervention.

In another embodiment, price improvement orders being submitted by predetermined traders may, by default, be dynamic price improved orders. The system may select which traders' orders are default price improved orders or the traders themselves may choose to have their price improved orders by dynamic price improved orders by default.

Figure 2:
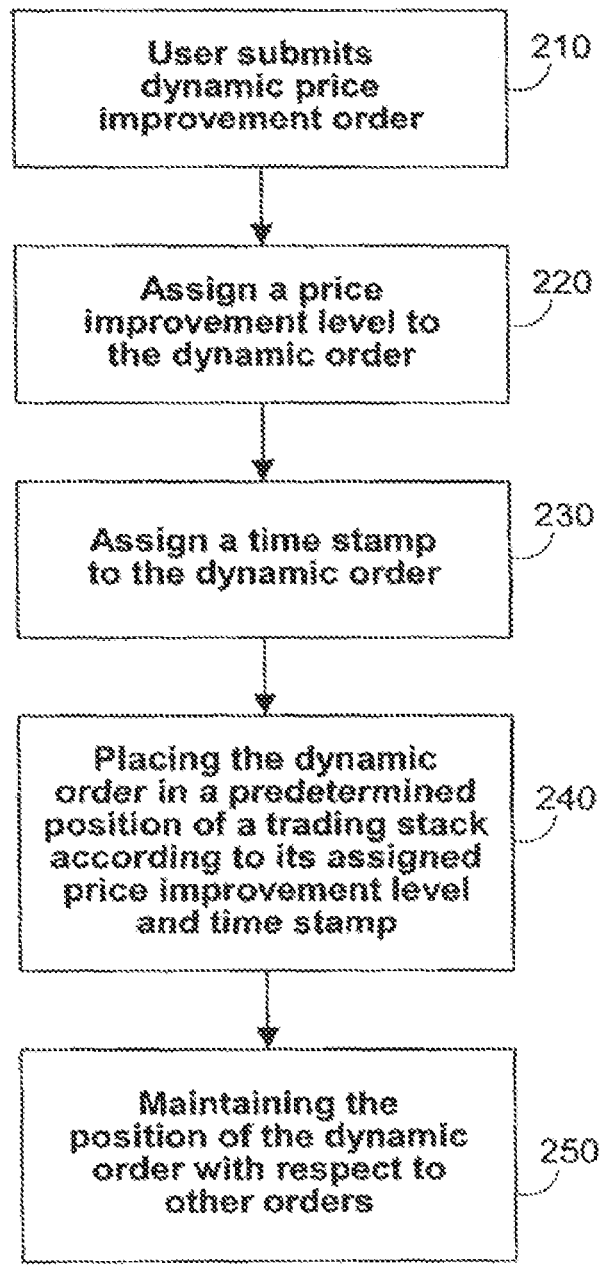
FIG. 2 shows an illustrative flowchart of submitting a dynamic price improvement order in a trading system.

FIG. 2 shows a flowchart 200 that illustrates use of a dynamic price improvement order. Starting at step 210, a user submits a dynamic price improvement order using, for example, a dialog window 100 of FIG. 1. At step 220, the trading system assigns a price improvement level to the dynamic order. The assigned price improvement level may depend on factors including, but not limited to, orders currently in the stack, the price improvement level of orders in the stack, other dynamic orders in the stack, and the timestamps of orders in the stack.

For example, if the dynamic order is the first order to be submitted, the system may initially assign that order a price improvement level of zero. In the case where orders already exist in the stack, but the orders are not dynamic orders, the system may assign a price improvement level that is one level higher than the highest price improvement level associated with any of the existing orders. For example, if the stack has an order with a price improvement level of one (but is not a dynamic order), the dynamic order may be assigned a price improvement level of two. If the price improvement level of the best order in the stack is at the maximum price improvement level, then the maximum price improvement level is assigned to the dynamic order.

If a dynamic order already exists in the stack, the trading system may assign the price improvement level of the existing dynamic order to the newly submitted dynamic order. This suppresses the price improvement level of a newly submitted dynamic order to prevent inflation of the price improvement level of the dynamic order already present in the stack. The price improvement level is suppressed because the new dynamic order cannot jump in front of an existing dynamic order because of the existing order's timestamp. However, in the event the existing dynamic order is the lone order in the stack, in which case the price improvement level of the existing order is zero, the price improvement level of the existing dynamic order and the new dynamic order is increased to one, thereby promoting the advantageous use of dynamic price improvement to reward the counter party and to promote dynamic price improvement. (The reward provided to a trader for trading with dynamic price improvement is discussed below).

At step 230, the system may assign a timestamp to the dynamic order. The timestamp indicates the time at which the dynamic order is submitted to the system and may be used to determine the particular position an order has in a stack. For example, in instances where two or more dynamic orders are submitted, the timestamp determines which order takes precedence. Note that dynamic orders may retain their original timestamp even if its price improvement level changes.

Proceeding to step 240, the system places the dynamic order in a predetermined position of a trading stack according to its assigned price improvement level and timestamp. The predetermined position may be relative and may change depending on market conditions such as submission of new orders (e.g., dynamic orders and price improvement orders), and the matching of orders, and cancellation of orders. A predetermined position is defined herein as the position a dynamic order has in a stack with respect to previously submitted orders and to subsequently entered orders. For example, if a price improved order having a maximum price improvement level is submitted before a dynamic order, the dynamic order is assigned a maximum price improvement level and may be placed below the price improved order because the price improved order has an earlier timestamp.

At step 250, the system maintains the dynamic order in the predetermined position with respect to previously submitted orders and to subsequently submitted orders. For example, if a dynamic order's predetermined position is second from the top of the stack, that order will remain second until the first order is cancelled or matched with a contra order. At this point, the predetermined position of the dynamic order shifts from being second to first (e.g., its new predetermined position). This order preferably remains first until matched or cancelled.

To maintain the dynamic order in a predetermined position, the trading system may change the price improvement level. The trading system may increase the price improvement level to maintain the order's position in the stack when an order having a price improvement level higher than the level of the dynamic order is submitted. If the price improvement level increases to the highest available level, then the system may use time priority to keep the dynamic order in its predetermined position.

Figure 3:
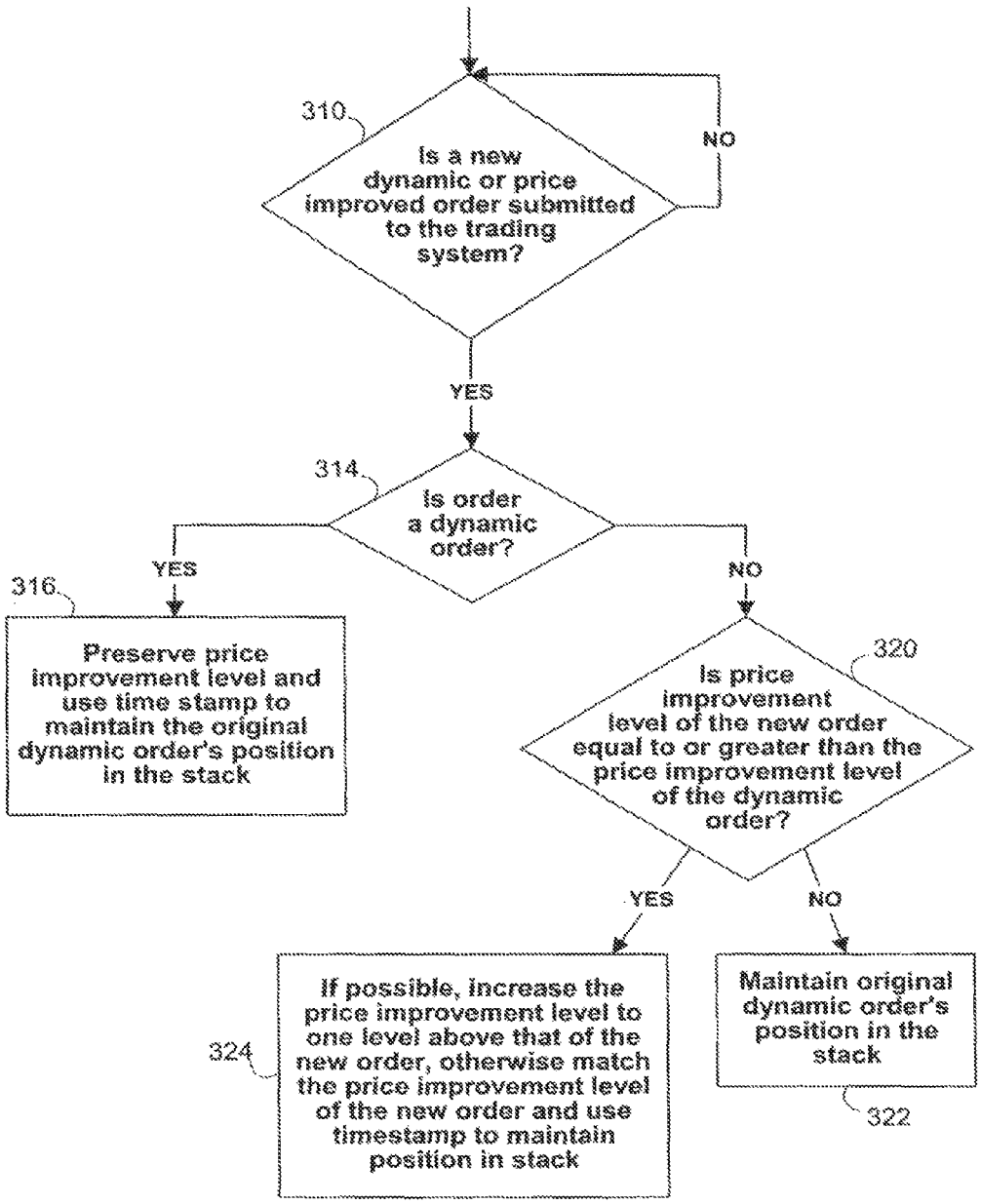
FIG. 3 shows an illustrative flowchart of how the trading system maintains a dynamic order in a particular location in a trading stack.

FIG. 3 shows a flowchart illustrating steps that may be taken to maintain the position of a dynamic order when a new order (e.g., either a dynamic order or price improved order) is submitted. In the context of this flowchart and for the purpose of clarity, the existing dynamic order is referred to as the original (dynamic) order.

Beginning at step 310, the system checks if a new dynamic or price improved order is submitted to the system. The system may continue to perform this check (as indicated by the feedback loop) until a new order is actually submitted, at which point the process advances to step 314. At step 314, a determination is made as to whether the new order is a dynamic order. If the new order is a dynamic order, the process proceeds to step 316, which preserves the price improvement level of the original order and uses the timestamp of the original order to maintain its position in the stack.

If the new order is not a dynamic order, the process proceeds to step 320. At step 320, the process determines whether the price improvement level of the price improved order is equal to or greater than the price improvement level of the original order. If not, then the system does not change anything with respect to the original order and it maintains its position in the stack, as indicated by step 322. However, if the price improvement level of the improved order equals or exceeds that of the dynamic order, the process proceeds to step 324. At step 324, the system may increase the price improvement level of the original order to a level (e.g., one level) above the level of the price improved order, if possible. Increasing the price improvement level of the original order ensures that the original order maintains its position in the stack. If the price improvement level of the original order cannot be increased to a level above the improved order's level, the system may match the price improvement level of the original order to the improved price order's level and use the timestamp of the original order to maintain its position in the stack.

FIG. 3 is merely illustrative and additional steps may added or some steps may be omitted.

There may be instances when the trading system decreases the price improvement level of the dynamic order. In these instances, the dynamic order maintains its position in the stack while at the same time decreasing its price improvement level. Decreasing the price improvement level puts the dynamic order in a position to provide a more advantageous execution price than if the price improvement level remained at the higher price improvement level than necessary to maintain its position in the stack.

Figure 4:
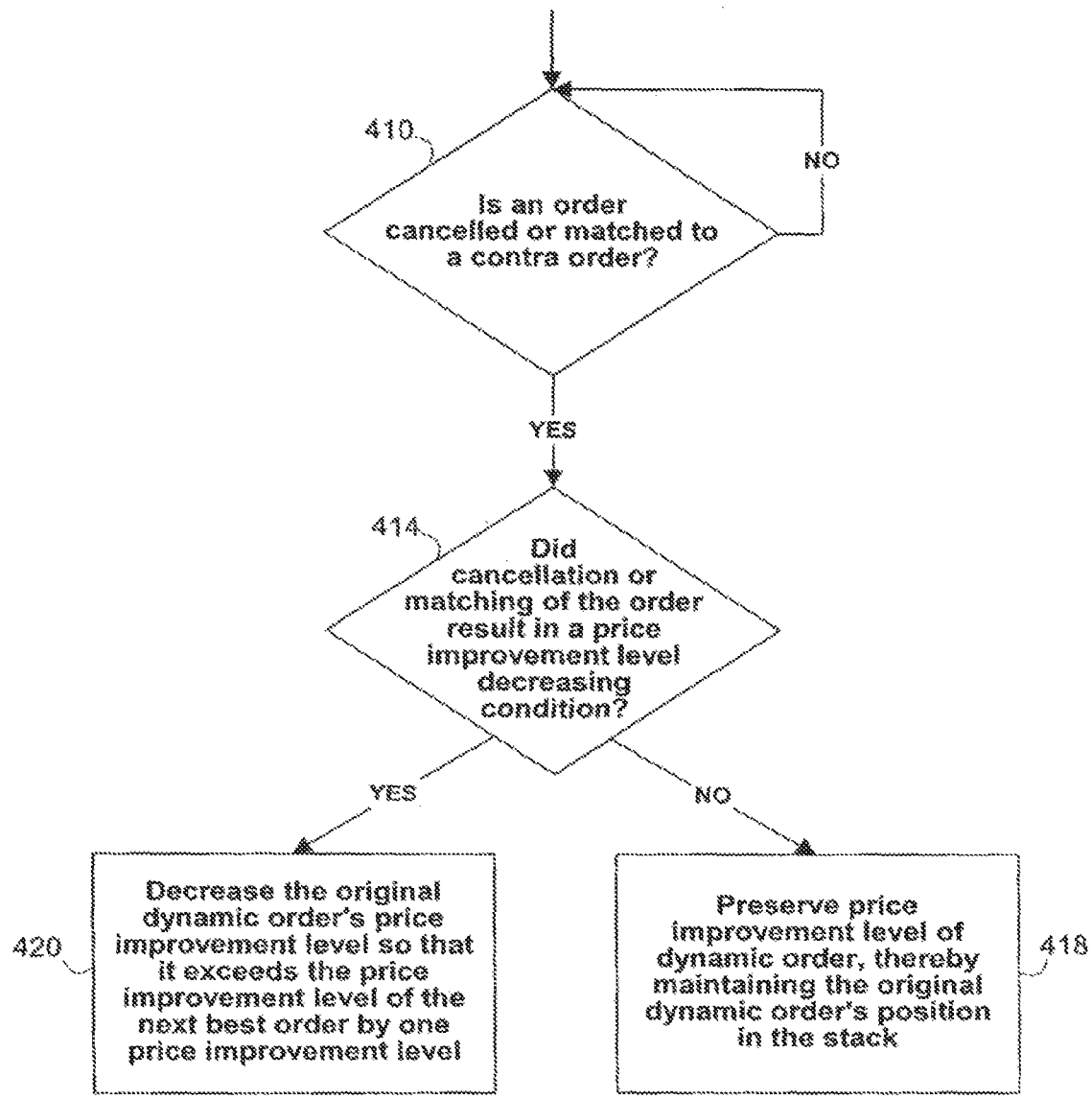
FIG. 4 shows an alternative illustrative flowchart of how the trading system maintains a dynamic order in a particular location in a trading stack.

FIG. 4 shows a flowchart illustrating steps that may be taken when an order is cancelled or matched with a contra order. Particularly, FIG. 4 illustrates how the system maintains a dynamic order in its predetermined position while at the same time possibly reducing the price improvement level of the dynamic order when orders are removed from the stack. In the context of this flowchart and for the purpose of clarity, the dynamic order potentially having its price improvement level reduced is referred to as the original (dynamic) order.

Beginning at step 410, the system determines whether an order is cancelled or matched to a contra order. The system may continue to perform this check (as indicated by the feedback loop) until an order is cancelled or matched, at which point the process proceeds to step 414. At step 414, the system determines whether the cancellation or matching of the order results in a "price improvement level decreasing" condition.

A price improvement level decreasing condition occurs when the original order has a price improvement level that exceeds the price improvement level of the next best order by at least two price improvement levels. By way of example assume that the original order has a price improvement level of three and the next best order has a price improvement level of one. Here the difference in price improvement levels is two, thus resulting in a price improvement level decreasing condition because the price improvement level of the original order can be reduced to two and still maintain its position in the stack.

If there is no price improvement level decreasing condition present, the process proceeds to step 418. At step 418, the system does not change the price improvement level of the original order, but continues to maintain the original order's position in the stack. If there is a price improvement level decreasing condition present, then the process proceeds to step 420.

At step 420, the system may decrease the price improvement level of the original order so that it exceeds the price improvement level of the next best order by one level. Although FIG. 4 is discussed in the context of one dynamic order, the discussion can be applied to several dynamic orders. For example, if two or more dynamic orders are in the stack, each having the same price improvement level, a cancellation of an order having a price improvement level below that of the dynamic orders may create a price improvement level decreasing condition. If the condition exists, then the price improvement level may be decreased in both dynamic orders.

The steps shown in FIG. 4 are merely illustrative and additional steps may be added or steps may be omitted.

Figure 5:
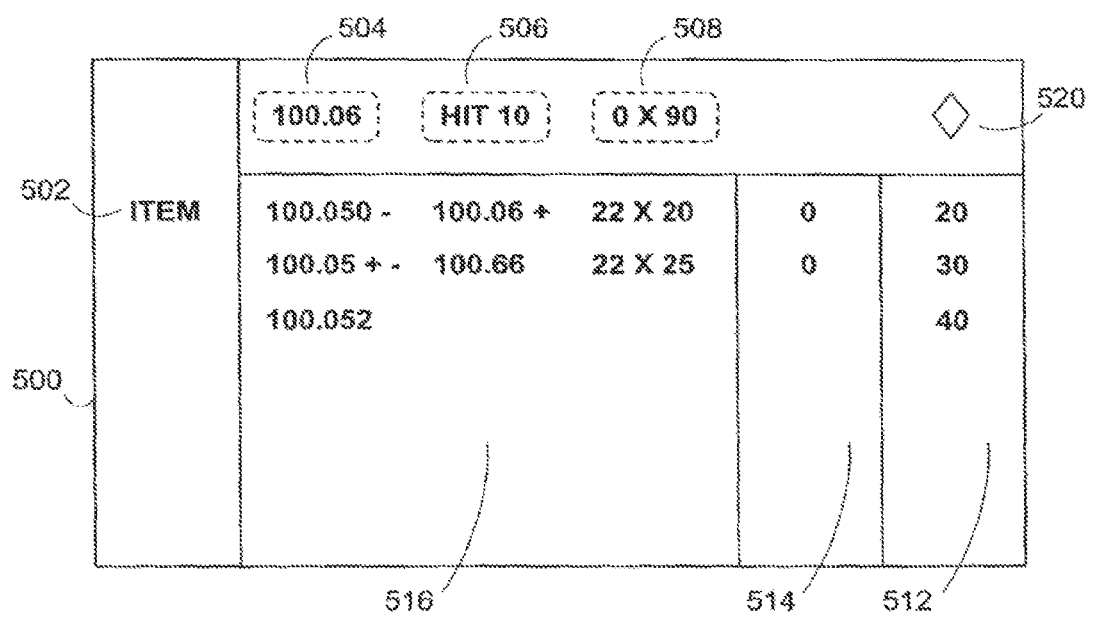

With reference now to FIG. 5, dynamic price improvement is described in context of market cell 500 for a selected item. FIG. 5 is described primarily in the context of a trade state in which traders are actively buying and selling an item by submitting buy and sell orders. Although FIG. 5 is being described in the context of a trade state, dynamic price improvement can be used in conjunction with a bid/offer state in which traders submit bids and offers for an item.

FIG. 5 illustrates a market cell 500 where users are participating in a market in which selected item 502 is being traded. Selected item 502 may be any suitable type of commodity such as, for example, securities, bonds, coupons, etc. Price 504 indicates the current selling and/or buying price of selected item 502. Trade status 506 provides an indication of what type of trading activity is taking place with respect to selected item 502. Item indicator 508 provides an indication of the quantity of selected item 502 available in the market. If, for example, sellers are operating in the active side of the market, the item indicator 508 informs market participants the total number of items 502 that are available for sale in the market. Seller stack 512 informs market participants the quantity of selected items 502 a particular seller is prepared to sell. Likewise, buyer stack 514 informs market participants the quantity of selected items 502 a particular buyer is prepared to buy. Market depth indicator 516 provides information regarding the depth of the market (i.e., the price and quantity of items available in the market, at prices different than the current price).

When a trader submits a dynamic order or a price improved order, a price improvement indicator 520 may be displayed to indicate that price improvement is taking place. Price improvement indicator 520 may be any suitable distinguishing character such as, for example, a diamond, a carrot, text (e.g., PI) or other distinguishing mark. In FIG. 5, the presence of price improvement indicator 520 indicates that at least one of the orders (e.g., the size 20, 30 or 40 orders) is price improved.

Price improvement indicator 520 informs all market participants that at least one trader is prepared to trade a specified number of items at an improved price, regardless of whether the improved price is a price improvement order or a dynamic order. But traders (except the traders. who submit price improved or dynamic orders) do not know what the price improvement level is.

Figure 6A:
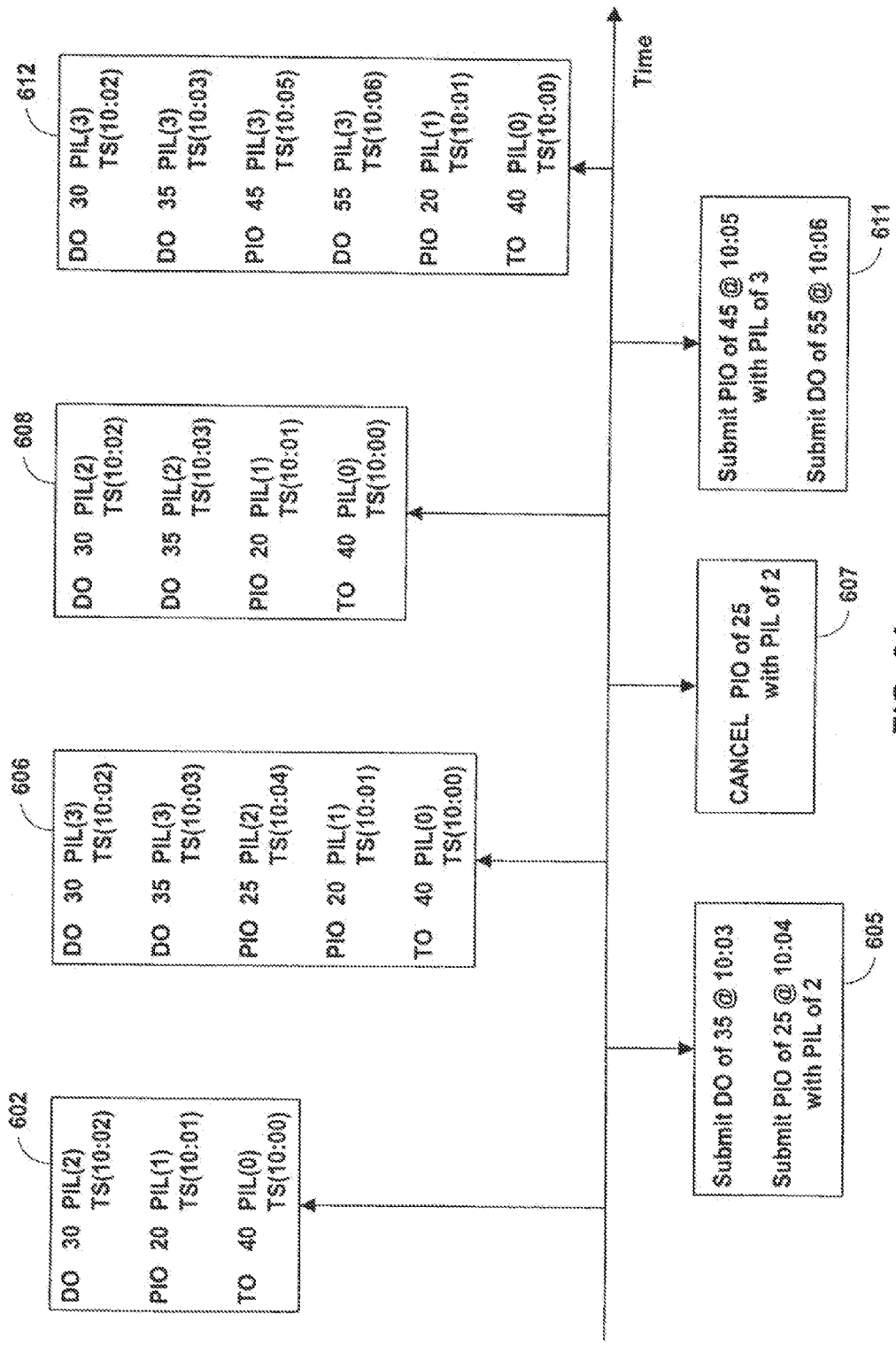
FIGS. 6A and 6B show an illustration of different modes of trading stacks that may occur.
Figure 6B:
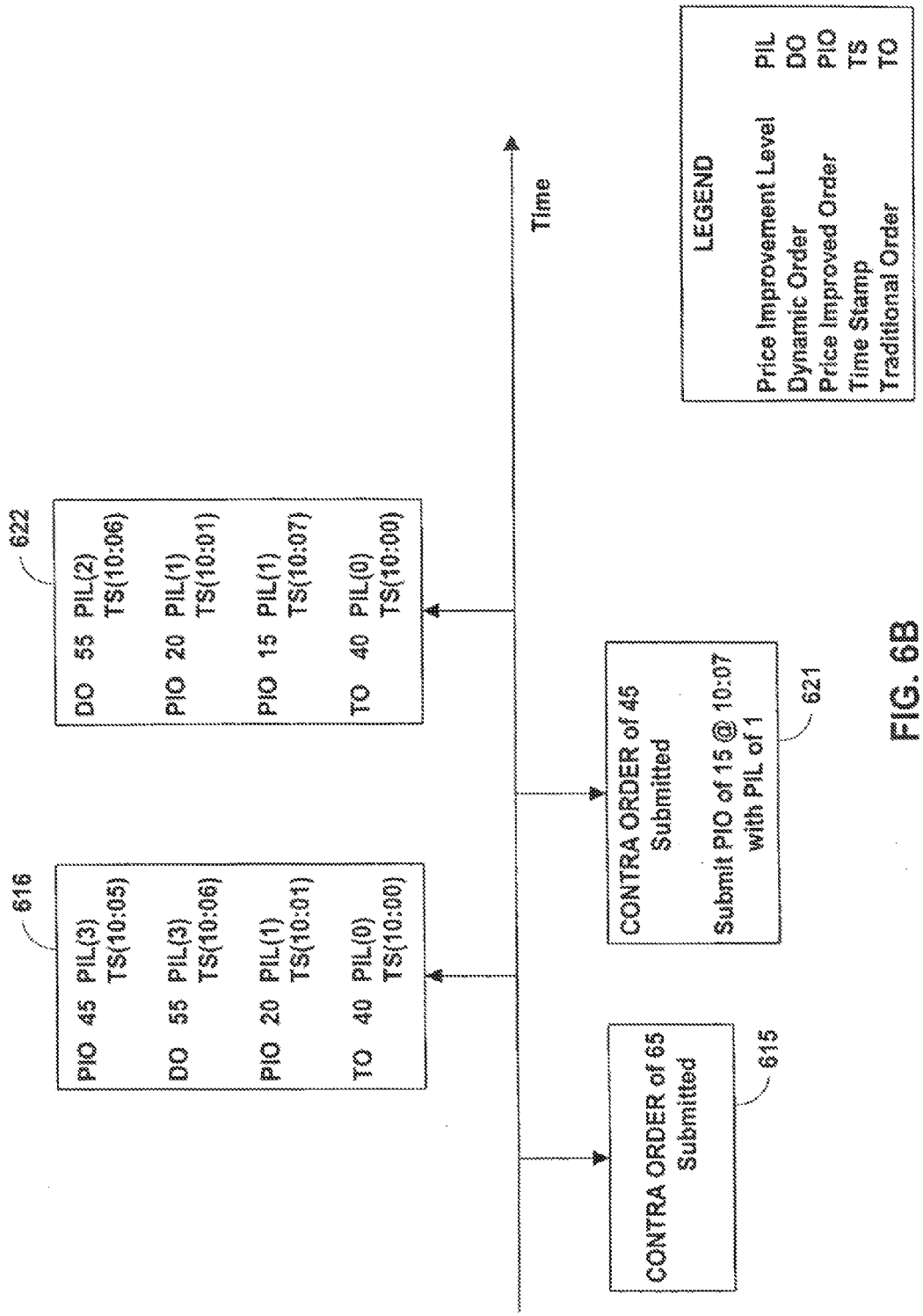

With reference now to the trading state diagram of FIGS. 6A and 6B, an example of how dynamic orders operate is now discussed. FIG. 6 shows several sell stacks (e.g., the sell stack of FIG. 5) disposed along an axis representing time. Each stack includes orders, with each order having an order type (e.g., dynamic, price improvement, or traditional), a price improvement level (e.g., PI=1), and a timestamp (e.g., 10:03). The legend in FIG. 6B defines the attributes associated with the orders. Time progresses from left to right. Trade commands, which are shown below the time axis, may cause the trade system to modify the position of the orders in the stack. Several "snapshots" of the stack, which are shown above the time axis, are shown to illustrate how the trade system maintains the position of the dynamic orders.

Stack 602 represents an arbitrary trading stack that may occur at a particular time. Stack 602 includes a dynamic order, a price improved order, and a traditional order. When trade commands, such as those shown in trade step 605 are issued, the trading system may arrange the orders as shown in stack 606. As shown, submission of the price improved order with a price improvement level of two causes the price improvement level of the dynamic order in stack 602 to increase to a price improvement level of three. At trade step 607, the cancellation of the price improved order having the price improvement level of two results in a stack as shown in stack 608. Stack 608 shows that the price improvement level of both dynamic orders dropped down to a level of two because the next best order only has a price improvement level of one.

At trade step 611, a price improved order and a dynamic order are submitted. Stack 612 illustrates the positions of the orders after trade execution at trade step 611. Note that for the purpose of this example, the maximum price improvement level is three. Thus, when the price improved order having a price improvement level of three is submitted, this forces the price improvement level of all the dynamic orders to three. Note, however, that the dynamic order of size 55 is positioned behind the size 45 order because its timestamp is after that of the size 45 order.

Stack 616 shows the stack after the size 30 and size 35 orders are matched to a contra order submitted at trade step 615. Trade step 621 shows that a contra order of size 45 and price improved order with a price improved level of one are submitted. The contra order is matched with the price improved order of size 45, resulting in stack 622. Note that the price improvement level of the dynamic order dropped down to two from three because the next best order has a price improvement level of one.

Dynamic orders can improve on orders of different types, such as limit, stop, good-till-canceled, all-or-none, market-if-touched, and is not limited to improving only on orders of the same type as the dynamic improved order. These different order types are known to those with skill in the art and need not be discussed with particularity.

Note that if a trader submits a traditional order using the next predetermined pricing increment, the type (e.g., stop, limit, etc.) of the order may determine whether the dynamic or price improved order remains in the stack.

Traders may have a monetary incentive to trade items when price improvement orders for that item are available. For example, a trader may be provided with a rebate (e.g., a predetermined quantity of money), the quantity of which may depend on several factors (e.g., level of price improvement used and the size being traded). The size of the rebate may correspond to the level of price improvement used in matching orders. For example, a trader may receive a larger rebate for an order traded at a price improvement level of three than for an order traded at a price improvement level of one. For a dynamic order, the rebate awarded to the trader may be based on the price improvement level of the order when matched. Alternatively, the rebate awarded to a trader using a dynamic order may be fixed, irrespective of the price improvement level of the order when matched.

An alternative rebate may be provided to the trader that decides to trade on a price improved order, but an order in the stack has a price improvement level of zero (i.e., the price improved order is the lone order in the stack). Because the price improvement level of the lone order is zero, the trader may not receive a rebate that corresponds to a particular level of price improvement. Rather, the trading system may provide the trader with the alternative rebate (e.g., a rebate that may be less than a rebate that would otherwise be received if the price improvement level is one or higher).

The trading system may send messages to traders to indicate what price improvement level is associated with their order. For example, when a user submits a dynamic price improvement order, the trading system may inform the trader which price improvement level is being used. Thereafter, if the price improvement level of the dynamic price improvement order changes, the system may transmit updated price improvement level information to the user.

Referring to FIG. 7, an exemplary system 700 for implementing the dynamic price improvement is shown. As illustrated, system 700 may include one or more trading workstations 701 that may include a mouse 706, a keypad 707, and a display 708. Workstations 701 may be local or remote, and are connected by one or more communications links 702 to a computer network 703 that is linked via a communications link 705 to a server 704.

In system 700, server 704 may be any suitable server, processor, computer, or data processing device, or combination of the same. Computer network 703 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 702 and 705 may be any communications links suitable for communicating data between workstations 701 and server 704, such as network links, dial-up links, wireless links, hard-wired links, etc. Each workstation enables a participant to engage in the trading process. Workstations 701 may be personal computers, laptop computers, mainframe computers, dumb terminals, data displays, Internet browsers, Personal Digital Assistants (PDAs), two-way pagers, wireless terminals, portable telephones, etc., or any combination of the same.

A back office clearing center 712 may also be connected to server 704 of the trading system via communications link 710. Clearing center 712 may be any suitable equipment, such as a computer, or combination of the same, for causing trades to be cleared and/or verifying that trades are cleared. If desired, server 704 may contain multiple processors.

For the convenience of the reader, the above description has focused on a representative sample of all possible embodiments, a sample that teaches the principles of the invention and conveys the best mode contemplated for carrying it out. Throughout this application and its associated file history, when the term "invention" is used, it refers to the entire collection of ideas and principles described; in contrast, the formal definition of the exclusive protected property right is set forth in the claims, which exclusively control. The description has not attempted to exhaustively enumerate all possible variations. Other undescribed variations or modifications may be possible. Where multiple alternative embodiments are described, in many cases it will be possible to combine elements of different embodiments, or to combine elements of the embodiments described here with other modifications or variations that are not expressly described. In many cases, one feature or group of features may be used separately from the entire apparatus or methods described. Many of those undescribed variations, modifications and variations are within the literal scope of the following claims, and others are equivalent.

The invention claimed is:

1. A method for operating an electronic trading system for the exchange of instruments, the method comprising the steps of:
   in an electronic trading system designed to receive and store orders to buy and to sell instruments as submitted by parties, and to execute trades between matching buy and sell orders, stored buy and sell orders having order matching priority orderings relative to each other reflecting at least one attribute of the order in addition to price, the order matching priority ordering used by the electronic trading system to determine priority among orders for matching for execution:
   receiving a dynamic price improvement order, being an order to buy or sell an identified instrument traded on the electronic trading system, whose order matching priority for execution against contraorders is maintained by the electronic trading system at least in part relative to earlier-submitted orders on the same side of the market by adjusting a price associated with the dynamic price improvement order;
   receiving orders contra to the dynamic price improvement order, and matching the contra orders to the stored orders on the same side of the market as the dynamic price improvement order, the dynamic price improvement order being matched to the contra orders with the order matching priority relative to other orders as maintained by the electronic trading system.

2. The method of claim 1, in which at least some of the contra orders received for matching to the dynamic price improvement order are hits or lifts against the side of the market of the dynamic price improvement order.

3. The method of claim 1, in which the change includes an increase in the price of the dynamic price improvement order.

4. The method of claim 1, in which the change includes a decrease in the price of the dynamic price improvement order.

5. The method of claim 1, in which the order matching priority of the dynamic price improvement order is a position at a front of a trading stack.

6. The method of claim 1, further comprising the step of:
   maintaining order matching priority of the dynamic price improvement order relative to other orders based on a timestamp assigned to the dynamic price improvement order.

7. The method of claim 6, further comprising maintaining the order matching priority based on the timestamp.

8. The method of claim 6, wherein in the event two or more the dynamic price improvement orders are received, the orders with older timestamps are matched prior to orders with newer timestamps.

9. The method of claim 1, wherein:
   the electronic trading system reveals orders to users at a fixed price increment, and the price increment at which the price of the dynamic price improvement order is adjusted is a fraction of the revealed price increment.

10. The method of claim 1, wherein:
    determining includes determining the price improvement level such that it is one level higher than the next best order in an order stack, wherein the price improvement level can be adjusted up to a maximum price improvement level.

11. The method of claim 1, further comprising the step of: determining the price improvement level of a best order in an order stack; and assigning a price improvement level to the dynamic price improvement order that improves the price of the dynamic price improvement order by one price improvement level when the price improvement level of the best order is not a maximum price improvement level.

12. The method of claim 11, further comprising the step of: assigning the maximum price improvement level to the dynamic price improvement order when the price improvement level of the best order is at the maximum price improvement level.

13. The method of claim 1, wherein the dynamic price improvement order is the default order type for designated parties that use a trading interface to submit orders to the electronic trading system.

14. The method of claim 1, further comprising the step of: providing to parties of the electronic trading system the option to select dynamic price improvement as one of several price improvement order types available for submission to the electronic trading system.

15. The method of claim 1 further comprising:
decreasing the price improvement level of at least one order on the same side of the market as the dynamic price improvement order such that the price improvement level of the at least one same-market-side order does not exceed the price improvement level assigned to the dynamic price improvement order.

16. The method of claim 15, wherein:
the price improvement level of the at least one second order is decreased to a price improvement level one level below a maximum price improvement level when the at least one price improved order is assigned a maximum price improvement level as its price improvement level.

17. A electronic trading system for the exchange of instruments, the system comprising at least one processor, the processor or processors of the system being configured to:
receive and store orders to buy and to sell instruments as submitted by parties, the stored buy and sell orders having order matching priority orderings relative to each other reflecting at least one attribute of the order in addition to price, the order matching priority used by the electronic trading system to determine order matching priority among orders for matching for execution;
receive a dynamic price improvement order, being an order to buy or sell an identified an instrument traded on the electronic trading system, whose order matching priority for execution against contraorders is maintained by the electronic trading system at least in part relative to earlier-submitted orders on the same side of the market by adjusting a price associated with the dynamic price improvement order; and
receive orders contra to the dynamic price improvement order, and match the contra order to the stored orders on the same side of the market as the dynamic price improvement order, the dynamic price improvement order being matched to the contra orders with the order matching priority relative to other orders as maintained by the electronic trading system.

18. The system of claim 17, in which the change includes an increase in the price of the dynamic price improvement order.

19. The system of claim 17, in which the change includes a decrease in the price of the dynamic price improvement order.

20. The system of claim 17, in which the order matching priority of the dynamic price improvement order is a position at a front of a trading stack.

21. The system of claim 17, wherein the processor is operative to maintain order matching priority of the dynamic price improvement order relative to other orders based on a timestamp assigned to the dynamic price improvement order.

22. The system of claim 21, wherein the processor is operative to maintain the order matching priority based on the timestamp.

23. The system of claim 17, wherein:
the electronic trading system reveals orders to users at a fixed price increment, and the price increment at which the price of the dynamic price improvement order is adjusted is a fraction of the revealed price increment.

24. The system of claim 17, wherein:
the processor is further operable to adjust the price of the dynamic price improvement order to one level more improved than the next best order in an order stack, wherein the price improvement level can be adjusted up to a maximum price improvement level.

25. The system of claim 17, wherein:
the processor is further operable to determine the price improvement level of a best order in an order stack; and assign a price improvement level to the dynamic price improvement order that improves the price of the dynamic price improvement order by one price improvement level when the price improvement level of the best order is not a maximum price improvement level.

26. The system of claim 25, wherein the processor is operative to assign the maximum price improvement level to the dynamic price improvement order when the price improvement level of the best order is at the maximum price improvement level.

27. The system of claim 17, wherein the dynamic price improvement order is the default order type for designated parties that use a trading interface to submit orders to the electronic trading system.

28. The system of claim 17, wherein:
the processor is operative to decrease the price improvement level of at least one order on the same side of the market as the dynamic price improvement order such that the price improvement level of the at least one same-market-side order does not exceed the price improvement level assigned to the dynamic price improvement order.

29. The system of claim 28, wherein the price improvement level of the at least one second order is decreased to a price improvement level one level below a maximum price improvement level when the at least one price improved order is assigned a maximum price improvement level as its price improvement level.

30. The system of claim 17, wherein:
the electronic treading system is operable to providing to parties of the electronic trading system the option to select dynamic price improvement as one of several price improvement order types available for submission to the electronic trading system.

* * * * *